United States Patent [19]

Nelson

[11] 4,382,449
[45] May 10, 1983

[54] MAGNETICALLY RESETTABLE EMERGENCY SHUT-OFF VALVE

[76] Inventor: Wesley C. Nelson, 698 S. 8th St., San Jose, Calif. 95112

[21] Appl. No.: 278,652

[22] Filed: Jun. 29, 1981

[51] Int. Cl.³ ............................................. F16K 17/36
[52] U.S. Cl. ......................................... 137/38; 251/65
[58] Field of Search ..................... 137/38, 39; 251/65

[56] References Cited

U.S. PATENT DOCUMENTS

| 4,091,831 | 5/1978 | Pazmany | 137/38 |
| 4,207,912 | 6/1980 | Ichikawa | 137/39 |
| 4,212,313 | 7/1980 | Winters | 137/39 |
| 4,245,814 | 1/1981 | Shimizu | 137/39 X |

FOREIGN PATENT DOCUMENTS

| 52-48847 | 4/1977 | Japan | 137/38 |
| 55-103171 | 8/1980 | Japan | 137/38 |

Primary Examiner—Robert G. Nilson
Attorney, Agent, or Firm—Fliesler, Dubb, Meyer & Lovejoy

[57] ABSTRACT

A magnetically resettable emergency shutoff valve (10) is disclosed. A valve member (26) shifts into a seat (28) and blocks flow of a fluid, such as natural gas, through the valve (10) in response to a seismic event of a selected magnitude. Movement of a magnet (32) externally of the valve (10) leads to movement of the ferromagnetic valve member (26) away from the seat (28).

5 Claims, 4 Drawing Figures

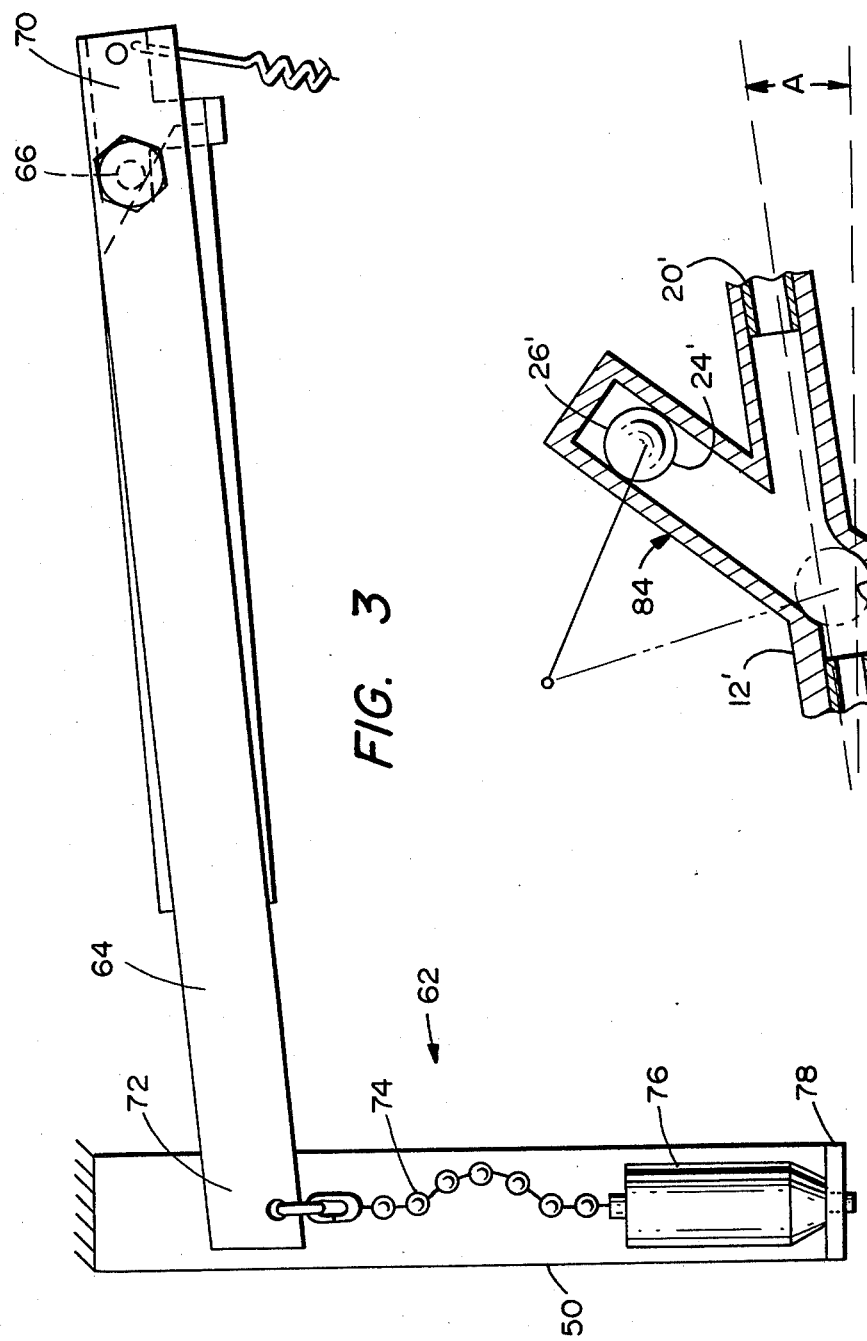

MAGNETICALLY RESETTABLE EMERGENCY SHUT-OFF VALVE

TECHNICAL FIELD

This invention relates to an emergency valve which will shut-off flow of a fluid in response to a force of at least a selected magnitude being exerted upon the valve. In particular, the valve of the invention will shut-off flow of an inflammable gas on the occurrence of a seismic event.

PRIOR ART

A number of emergency shut-off valves have been proposed which will shut-off the flow of gas through a line on the occurrence of a seismic event such as an earthquake. For example, each of U.S. Pat. Nos. 3,791,396; 4,091,831; 4,207,912; and 4,212,313 teach such valves.

A problem which is universal with prior art shut-off valves is that resetting of the valves requires the use of a resetting member, of one sort or another, which enters the valve chamber from outside of the valve body. As a result, a potential source of leakage is present in each of these valves, namely the entry path of such a resetting member.

Yet another problem with various prior art emergency shut-off valves is that they are generally sensitive only to, or at least primarily only to, horizontal shock waves. That is, their sensitivity to vertical shock waves is, at best, only slight. As a result, a shut-off valve device of this nature which is sitting directly above the epicenter of an earthquake of a given magnitude may not be activated by such an earthquake, whereas an identical device located a distance away from the epicenter, and which is not readily subjected to quite as hard of a shock, will be properly activated.

Still another problem with prior art shock sensitive emergency shut-off valves is that they generally do not provide the capability of independently and individually adjusting the degree of sensitivity of the valve to both horizontal shock waves and vertical shock waves. Such adjustability is desirable, since, each emergency shut-off valve is generally positioned horizontally a different distance from the probable epicenter of an earthquake, i.e., a different distance from one or more faults which are considered likely to create such an earthquake. As a result, it might be desirable to have one emergency shut-off valve be relatively more sensitive to a vertical shock wave and another emergency shut-off valve to be relatively more sensitive to a horizontal shock wave.

The present invention is directed to overcoming one or more of the problems as set forth above.

DISCLOSURE OF THE INVENTION

In accordance with the present invention, an improvement is presented in an emergency shut-off valve which comprises a valve body having a fluid-tight chamber having a fluid inlet and a fluid outlet communicating with it and housing a valve member within the chamber. The chamber has a region spaced from the outlet and the outlet has a seat. The valve member can be positioned in the region or against the seat where it prevents fluid from exiting the chamber. Means are present for normally detenting the valve member into the region in the chamber and means are provided for overriding the detenting means and moving the valve member into the seat in response to a force of at least a selected magnitude being exerted upon the valve member. The improvement of the invention comprises the valve body being of a non-ferromagnetic nature, the valve member being of a ferromagnetic nature and means external of the valve body for magnetically moving the valve member out of the seat and into the region of the chamber.

When operating in accordance with the invention, an emergency shut-off valve is provided which can be reset through the use of magnetic foce after it has been shut-off. As a result, the valve chamber is not entered by any sort of a resetting member. Thus, the resetting mechanism allows the valve chamber to completely maintain its integrity. When operating in accordance with the preferred embodiments of the invention, means are provided for adjusting the magnitude of the horizontal component of force and the vertical component of force which are sufficient to activate the overriding means. This allows individual adjustment of these forces dependent upon the location of the particular emergency shut-off valve.

BRIEF DESCRIPTION OF THE DRAWINGS

The invention will be better understood by reference to the figures of the drawings wherein:

FIG. 3 illustrates a partial view taken along the line III—III of FIG. 1; and

FIG. 4 illustrates an alternate embodiment of a portion of an apparatus in accordance with the present invention.

BEST MODE FOR CARRYING OUT THE INVENTION

Figure 1:
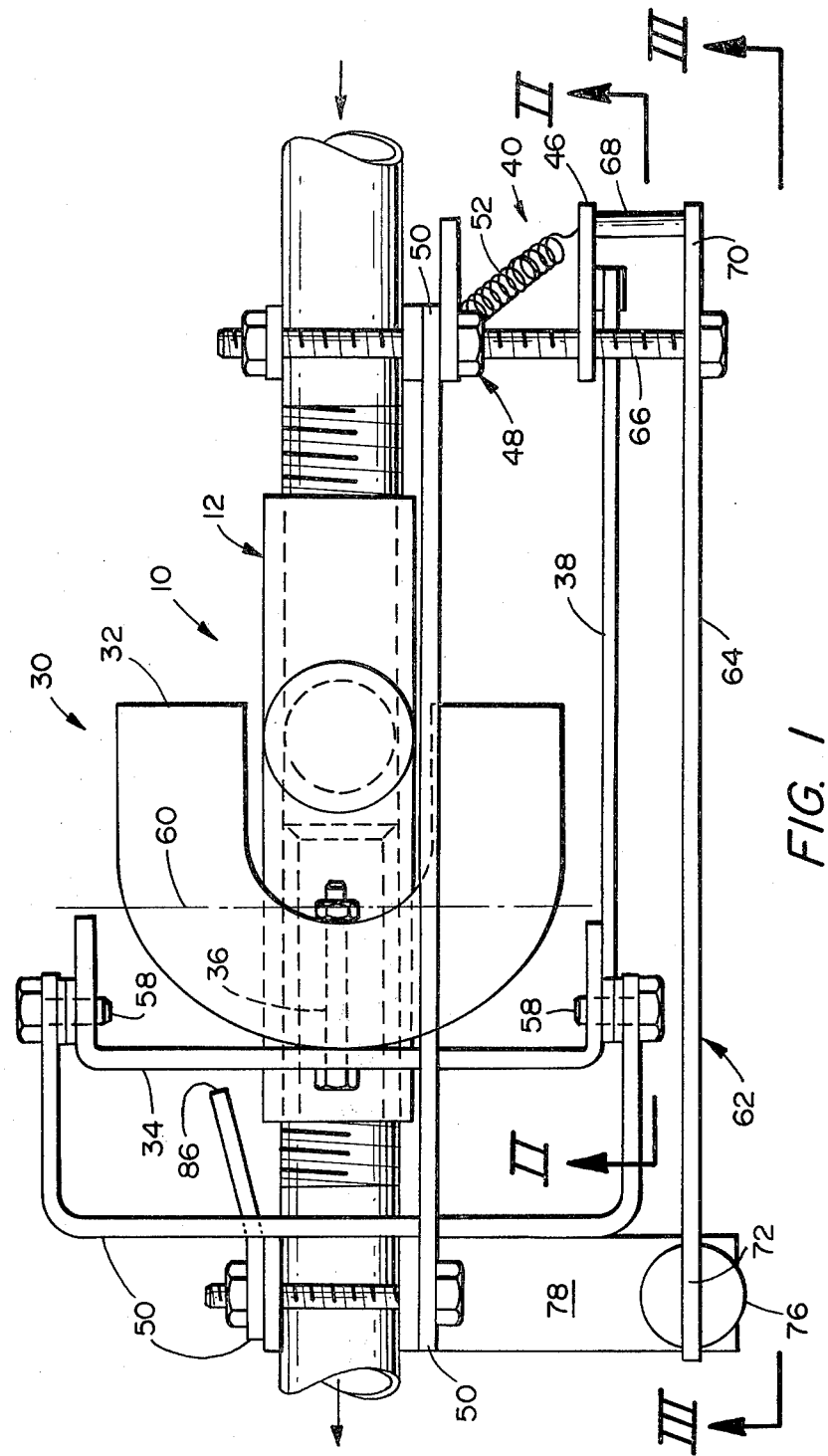
FIG. 1 illustrates, in plan view, an apparatus in accordance with an embodiment of the present invention.
Figure 2:
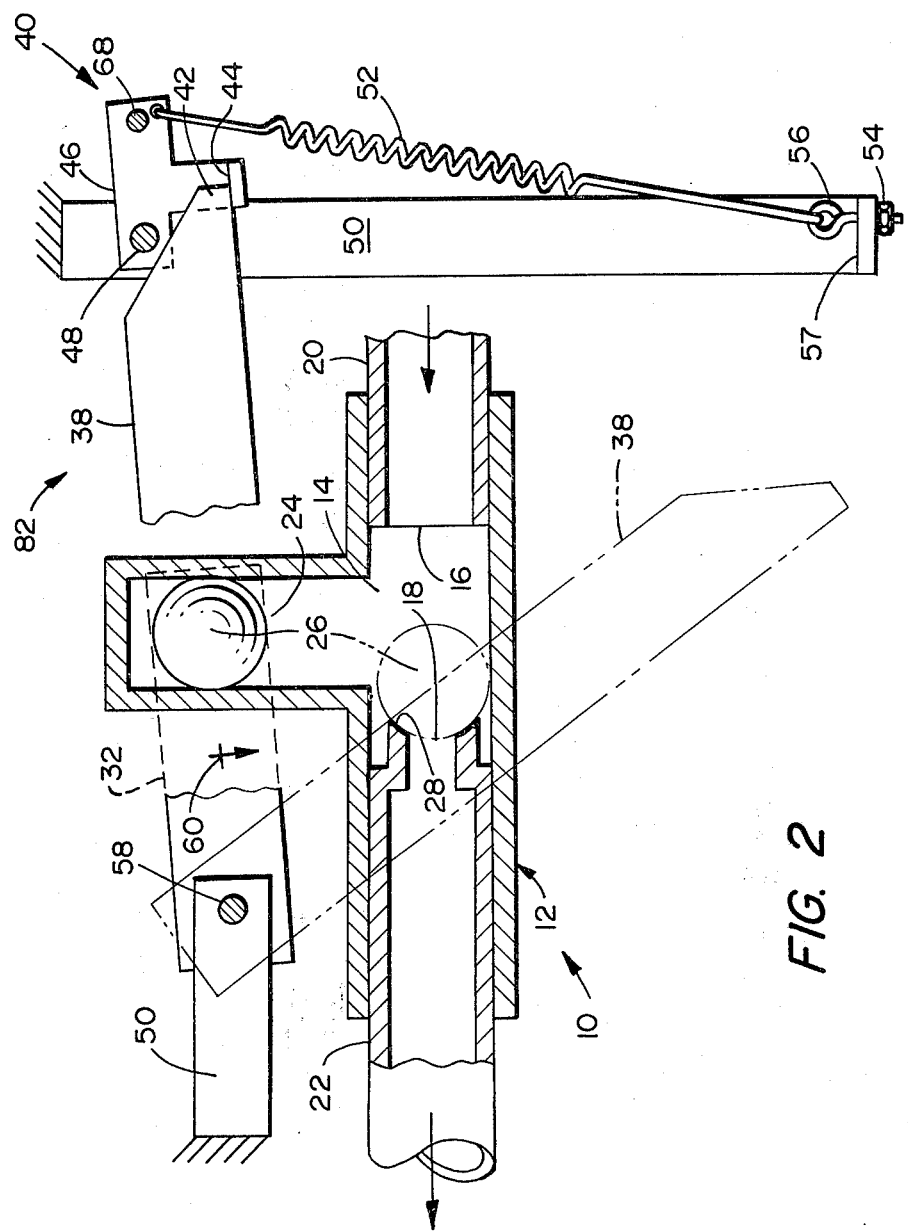
FIG. 2 illustrates a view taken along the line II—II of FIG. 1 with the valve being shown in section.

FIGS. 1 and 2 show an emergency shut-off valve 10 in accordance with the present invention. The valve 10 includes a valve body 12 in a generally T-shaped configuration. The valve body 12 has an interior fluid-tight chamber 14 and also has a fluid inlet 16 and a fluid outlet 18 defined partiallly by an inlet pipe 20 and an outlet pipe 22. Gas flow is as illustrated by the arrows from the inlet pipe 20, through the chamber 14 and exiting through the outlet pipe 22. The chamber 14 includes a region 24 which is spaced from the outlet 18. A valve member 26, in the embodiment illustrated a spherical valve member, can be positioned in the region 24 where it is free from interference with fluid exiting the chamber 14 or can be placed against a seat 28 located at the outlet 18. The seat 28 would normally be of a generally spherical configuration so as to accept the generally spherical valve member 26. When the valve member 26 is sitting against the seat 28 it serves to prevent fluid from exiting the chamber 14.

Means 30 are provided for normally detenting the valve member 26 into the region 24 of the chamber 14. In the particular body illustrated the detenting means 30 is provided by a magnet 32, a frame 34 which is fixedly attached, as by a bolting member 36 to the magnet 32 and an arm 38 which extends from the frame 32 to adjacent a triggering device 40. The valve body 12 may be placed at an angle, perhaps 45°, to the horizontal so that the outlet pipe 22 is downhill relative to the inlet pipe 20 to assure seating of the valve member 26 should the magnet 32 be removed, as by vandals.

The arm 38 normally has an extending end 42 which is held upon a shelf 44 of a trigger 46 which is pivotally mounted at a pivot 48 to a stationary support 50. A spring 52 determines the force which must be exerted on the trigger 46 in order for it to release the extending end 42 of the arm 38. The force can be adjusted by using different strength springs 52, or can be adjusted over at least a slight range by adjusting a nut 54 which is attached to a bolting member 56 to which the spring 52 is attached and which in turn is attached to a shelf 57 of the stationary support 50. FIG. 2 shows the arm 38, in phantom, rotated clockwise and in the position into which it moves under the influence of gravity if the trigger 46 is moved by pivoting it about the pivot 48 in a counterclockwise direction sufficiently to release the extending end 42. As will be apparent from FIG. 2, the magnet 32, the frame 34 and the arm 38 are pivotally attached at a pivot 58 to the stationary support 50. Further, the center of gravity of the entire magnet 32—the frame 34—arm 38 arrangement, indicated generally at 60, is such that the arrangement rotates to the rotated position shown in phantom in FIG. 2 on release of the extending end 42 of the arm 38.

Referring primarily to FIGS. 1 and 3, there will be seen the means 62 which is provided for tripping the trigger 46. In accordance with the present invention, the means 62 is illustrated which serves for overriding the detenting means 30 and moving the valve member 26 into the seat 28 in response to a force of at least a selected magnitude being exerted upon the valve member 26. The illustrated overriding means 62 includes a rod 64 which is pivotally mounted by a shaft 66 to the pivot 48 shown in FIGS. 1 and 2. Thus, both the trigger 46 and the rod 64 are pivotally mounted at the pivot 48 to the stationary support 50. The rod 64 is fixedly connected via a shaft 68 to the trigger 46. Thus, when the rod 64 rotates about the pivot 48, the trigger 46 must rotate with it.

The shafts 66 and 68 connect the rod 64 and the trigger 46 at a first end portion 70 of the rod 64. A second end portion 72 of the rod 64 is attached by a flexible member such as a small chain 74 to a weight 76. The weight 76 is balanced upon a shelf 78 (FIGS. 1 and 3) which is connected to the stationary support 50. The sensitivity of the valve 10 to horizontal shock waves is adjustable by adjusting the mass of the weight 76, its shape and the area and geometry of its contact with the shelf 78.

It will be apparent that the sensitivity of the triggering device 40 to vertical shock waves can be adjusted by adjusting the strength of the spring 52 and the setting of the nut 54. Thus, independent adjustment of sensitivity to horizontal and vertical shock waves is provided.

It is necessary, when operating in accordance with the present invention, that the valve body 12 be of a non-ferromagnetic nature. For example, the valve body 12 can be plastic. Alternatively, and preferably, the valve body 12 is made of a non-ferromagnetic stainless steel. It is also necessary, in accordance with the present invention, that the valve member 26 be of a ferromagnetic nature. For example, the valve member 26 can preferably be made of a ferromagnetic stainless steel, although it can alternatively be made of any other ferromagnetic material, can be made with a ferromagnetic core and a non-magnetic, for example, plastic, covering, or the like, etc.

The magnet 32 serves as means for magnetically moving the valve member 26 out of the seat 28 and into the region 24 of the chamber 14. It is noted that the magnet 32 is completely external of the chamber 14 and that the integrity of the chamber 14 is in no way compromised through use of the magnet 32. It will be apparent that the magnet 32 is normally biased, by gravity, into a first location, as shown in phantom in FIG. 2, adjacent the seat 28 and that the detenting means 30 of the valve member 26 includes the triggering device 40, which along with the arm 38 and frame 34 serves as means 82 for detenting the magnet 32 into a second location, as shown in solid lines in FIG. 2, which is remote from the seat 28 and which is adjacent the region 24.

The overriding means 62, for overriding the detenting means 30, also includes means, in the embodiment illustrated the rod 64 and weight 76, for overriding the magnet detenting means 82 and for allowing the magnet 32 to move to its first location (phantom lines in FIG. 2) in response to a selected force being exerted upon the magnet detenting means 82. The overriding means 62 essentially serves for overriding the detenting means 30 and for moving the valve member 26 into the seat 28 in response to a respective one of a horizontal component of the force and a vertical component of the force. If the force has a sufficient horizontal component, it causes the weight 76 to tumble thus tripping the trigger 76. If the force has a sufficient vertical component, this acts directly upon the rod 64 causing it to pivot about the pivot 48, thus causing the trigger 46 to pivot, likewise, about the pivot 48 and releasing the extending end 42 of the arm 38 from the shelf 44 of the trigger 46. Thereafter, the weight of the magnet 32 causes pivoting thereof about the pivot 58 and the magnet detenting means is overridden.

The shut-off valve of the present invention is also useful in high pressure flow lines, for example, ammonia flow lines. In such instances it is necessary to provide a valved bypass line around the shut-off valve to allow pressure to be released before the valve member 26 is reset in the region 24.

EMBODIMENT OF FIG. 4

FIG. 4 illustrates an embodiment much like that of FIGS. 1–3, but wherein the region 24' is in a branch-portion 84 of the valve body 12' and the branch-portion 84 is at an angle, for example, about 45°, from the vertical, instead of being directly vertical. This has the advantage that if the magnet should be removed, as by vandals, the valve will immediately shut-off, thus giving warning that a problem exists. The valve member 26' simply runs down the branch-portion 84 and is then seated against the seat 28'. The valve body 12' is preferably at a small angle, A, to the horizontal so that the outlet pipe 22' is slightly downhill relative to the inlet pipe 20'.

INDUSTRIAL APPLICABILITY

The shut-off valve of the present invention is particularly useful for shutting off inflammable gas, such as natural gas, in the case of an earthquake or other seismic occurrence.

A single such valve is normally be installed in the main gas inlet line to a residence or business. It can be installed just upstream or just downstream of the gas meter. The valve and its associated tripping hardware are normally be enclosed in a box to prevent accidental activation. If a seismic event of a selected magnitude, selected by adjustment of the weight 76 and the spring 52, occurs, the arm 78 is released and the magnet 32 pivots downwardly carrying with it the valve member 26 into blocking relation to the outlet 18 from chamber 14. A stop 86 generally of a ferromagnetic material, serves to assure that the magnet 32 does not rotate too far and that it is held in a set position. Preferably, the magnet 32 rotates just slightly past the point where the valve member 26 is exactly aligned with the seat 28. Yet, the magnet 32 is still positioned so that the valve member 26 is well within the magnetic field generated by the magnet 32. In this manner, there is a component of force acting upon the valve member 26 and forcing it into strong contacting relation with the seat 28. While an electromagnet could conceivably be used as the magnet 32, this is not desirable since it would then be subject to electric power failures. Hence, it is highly preferred to utilize a permanent magnet.

Other aspects, objects and advantages of this invention can be obtained from a study of the disclosure and the appended claims.

I claim:

1. In an emergency shut-off valve (10) which comprises a valve body (12) of a non-ferromagnetic nature having a fluid tight chamber (14) having a fluid inlet (16) and a fluid outlet (18) communicating therewith, said chamber (14) having a region (24) spaced from said outlet (18), said outlet (18) having a seat (28), a valve member (26) of a ferromagnetic nature adapted to sit in a respective one of said region (24) and said seat (28), said valve member (26) being free from interference with fluid exiting said chamber (14) when in said region (24) and preventing fluid from exiting said chamber (14) when in said seat (28) and means (30) for normally detenting said valve member (26) into said region (24), an improvement comprising:

resetting means (32) external of said valve body (12) for magnetically moving said valve member (26) out of said seat (28) and into said region (24), said resetting means (32) including a magnet (32) normally biased into a first location adjacent said seat (28);

said valve member (26) normal detenting means (30) including means (82) for detenting said magnet (32) into a second location remote from said seat (28) and adjacent said region (24); and means (62) for releasing said magnet detenting means (82) for allowing said magnet (32) to move under and due to the influence of gravity to said first location in response to a seismic force of at least a selected magnitude being exerted upon said magnet detenting means (82) and for allowing said valve member (26) to move into said seat (28).

2. In an emergency shut-off valve (10) which comprises a valve body (12) of a non-ferromagnetic nature having a fluid tight chamber (14) having a fluid inlet (16) and a fluid outlet (18) communicating therewith, said chamber (14) having a region (24) spaced from said outlet (18), said outlet (18) having a seat (28), a valve member (26) of a ferromagnetic nature adapted to sit in a respective one of said region (24) and said seat (28), said valve member (26) being free from interference with fluid exiting said chamber (14) when in said region (24) and preventing fluid from exiting said chamber (14) when in said seat (28) and means (30) for normally detenting said valve member (26) into said region (24), an improvement comprising:

magnet means (32) wholly external of said valve body (12) for magnetically moving said valve member (26) out of said seat (28) and into said region (24);

means (62) for releasing said detenting means (30) for allowing said valve member (26) to move substantially immediately under and due to the influence of both gravity and of said magnet means (32) into said seat (28) in direct response to either respective one of a horizontal component and a vertical component of a seismic force of at least a selected magnitude being exerted upon said detenting means (30); and stop means (86) for holding said magnet means (32) in a set position for providing a component of magnetic force which acts upon said valve member (26) to bias said valve member (26) into contacting relation with said seat (28).

3. In an emergency shut-off valve (10) which comprises a valve body (12) of a non-ferromagnetic nature having a fluid tight outlet (18) communicating therewith, said chamber (14) having a region (24) spaced from said outlet (18), said outlet (18) having a seat (28), a valve member (26) of a ferromagnetic nature adapted to sit in a respective one of said region (24) and said seat (28), said valve member (26) being free from interference with fluid exiting said chamber (14) when in said region (24) and preventing fluid from exiting said chamber (14) when in said seat (28) and means (30) for normally detenting said valve member (26) into said region (24), an improvement comprising:

means (32) external of said valve body (12) for magnetically moving said valve member (26) out of said seat (28) and into said region (24);

means (62) for releasing said detenting means (30) for allowing said valve member (26) to move into said seat (28) in response to either respective one of a horizontal component and a vertical component of a seismic force of at least a selected magnitude being exerted upon said detenting means (30);

means (76) for adjusting the magnitude of said horizontal component which is sufficient to activate said means (62); and means (52, 54) for adjusting the magnitude of said vertical component which is sufficient to activate said means (62).

4. A valve (10) as set forth in claim 3, wherein said horizontal component adjusting means (76) and said vertical component adjusting means (52,54) are adjustable independently of one another.

5. In an emergency shut-off valve (10) which comprises a valve body 12 of a non-ferromagnetic nature having a fluid tight chamber (14) having a fluid inlet (16) and a fluid outlet (18) communicating therewith, said chamber (14) having a region (24) spaced from said outlet (18), said outlet (18) having a seat (28), a valve member (26) of a ferromagnetic nature adapted to sit in a respective one of said region (24) and said seat (28), said valve member (26) being free from interference with fluid exiting said chamber (14) when in said region (24) and preventing fluid from exiting said chamer (14) when in said seat (28) and means (30) for normally detenting said valve member (26) into said region (24), an improvement comprising:

means (62) for releasing said detenting means (30) for allowing said valve member (26) to move under and due to the influence of gravity into said seat (28) in response to a seismic force of at least a selected magnitude being exerted upon said detenting means (30);

means (32) wholly external of said valve body (12) for magnetically moving said valve member (26) out of said seat (28) and into said region (24); and wherein said valve member (26), when in said region (24), is positioned completely out of a direct flow path from said fluid inlet (16) to said fluid outlet (18).

* * * * *